United States Patent [19]
Lichtenberger

[11] 4,441,787
[45] Apr. 10, 1984

[54] FIBER OPTIC CABLE AND METHOD OF MANUFACTURE

[75] Inventor: Rosemary K. Lichtenberger, Elgin, Ill.

[73] Assignee: Cooper Industries, Inc., Houston, Tex.

[21] Appl. No.: 258,618

[22] Filed: Apr. 29, 1981

[51] Int. Cl.³ .................................................. G02B 5/14
[52] U.S. Cl. ........................................ 350/96.23; 57/7
[58] Field of Search .................. 350/96.23; 57/7, 13, 57/295

[56] References Cited

U.S. PATENT DOCUMENTS

| | | | |
|---|---|---|---|
| 3,496,717 | 2/1970 | Costello et al. | 57/7 |
| 3,589,121 | 6/1971 | Mulvey | 57/7 |
| 3,883,218 | 5/1975 | Slaughter | 350/96.23 |
| 3,887,265 | 6/1975 | Margolis et al. | 350/96.23 |
| 3,955,878 | 5/1976 | Nowak | 350/96.23 |
| 4,105,284 | 8/1978 | Olshansky | 350/96.33 |
| 4,113,349 | 9/1978 | Stiles | 350/96.23 |
| 4,129,356 | 12/1978 | Oestreich | 350/96.23 |
| 4,141,622 | 2/1979 | Beal | 350/96.23 |
| 4,147,407 | 4/1979 | Eichenbaum et al. | 350/96.23 X |
| 4,169,657 | 10/1979 | Bedard | 350/96.23 |
| 4,191,448 | 3/1980 | Dean et al. | 350/96.23 |
| 4,288,144 | 9/1981 | Nakai et al. | 350/96.23 |
| 4,341,440 | 7/1982 | Trezeguet et al. | 350/96.23 |
| 4,342,500 | 8/1982 | Oestreich et al. | 350/96.23 |

FOREIGN PATENT DOCUMENTS

| | | | |
|---|---|---|---|
| 54-97440 | 8/1979 | Japan | 350/96.23 |
| 1571110 | 7/1980 | United Kingdom | 350/96.23 |

*Primary Examiner*—John D. Lee
*Attorney, Agent, or Firm*—Fitch, Even, Tabin & Flannery

[57] ABSTRACT

The present invention relates to an improved fiber optic cable and a method for manufacturing the same. An optical fiber is maintained concentrically within a textile serve by means of a highly viscous coating applied to the optical fiber. The result is an economical fiber optic cable in which microbending and concomitant signal loss are minimized.

10 Claims, 4 Drawing Figures

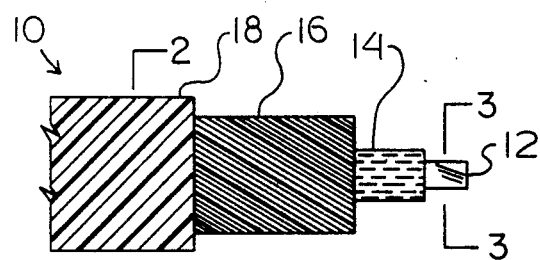
FIG. 1
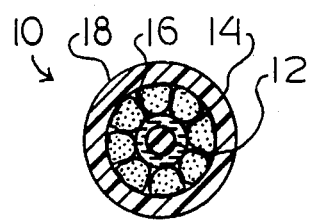
FIG. 2
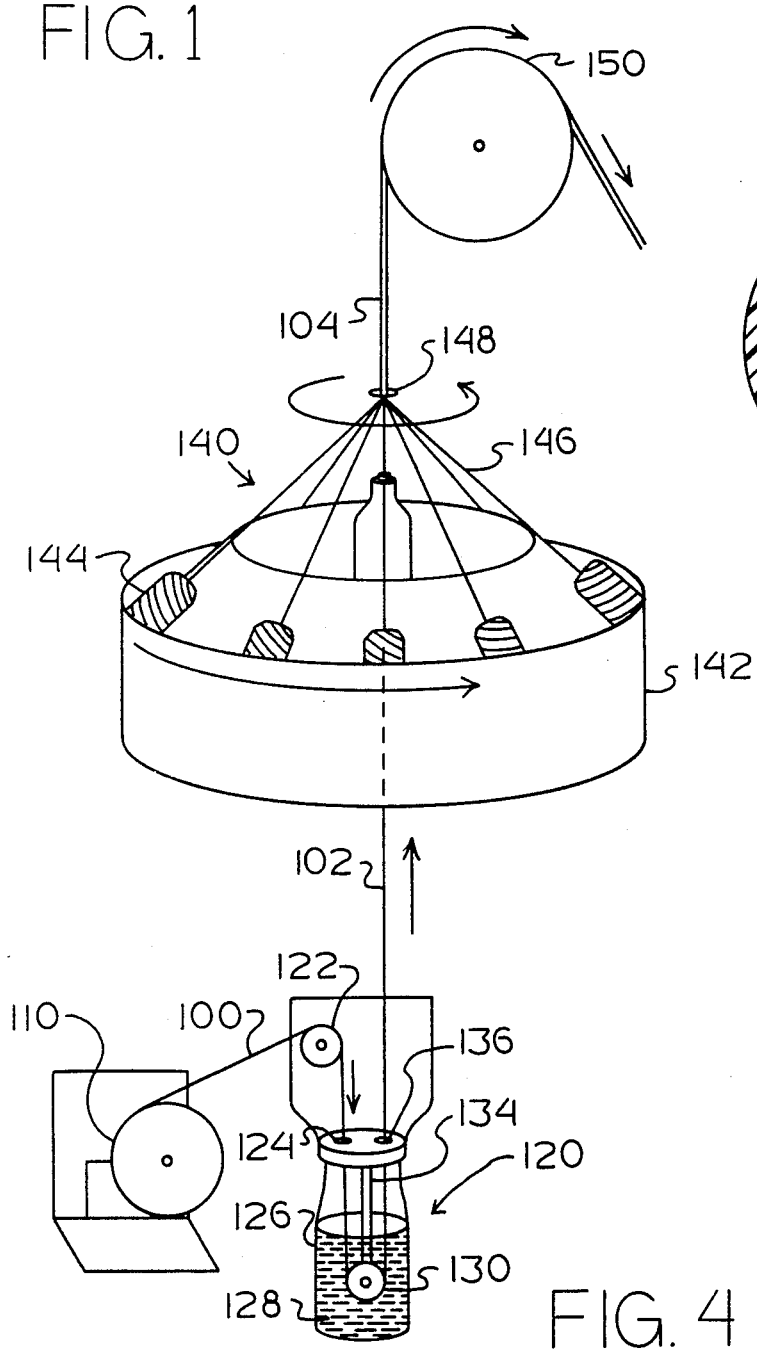
FIG. 3
FIG. 4

FIBER OPTIC CABLE AND METHOD OF MANUFACTURE

BACKGROUND OF THE INVENTION

This invention relates to a fiber optic cable, and more particularly to a fiber optic cable wherein an optical fiber extends axially within a helically wound textile serve. The invention also relates to a method of manufacturing such a cable.

Fiber optic cables often comprise a concentric series of elements. A fiber optic element usually extends axially along the cable and serves as an optical wave path. The fiber extends within one or more concentrically arranged layers extending longitudinally along the cable. These layers are designed to provide protection and support for the relatively delicate optical fiber, as well as other properties desirable in such a cable such as flexibility, tensile, flexure and impact strength. A cable jacket is usually selected to render the cable flame and moisture resistant. Usually, a tube, or a strength member, or both are placed over the buffered or unbuffered fiber, and the jacket is extruded thereover to complete the cable and define its outside diameter.

One of the more economical methods of providing strength and protection to a relatively delicate optical fiber is to overlay the optical fiber with textile strength members in a serving operation. One major problem with cables of such construction resides in the maintenance of concentricity between the fiber and the serve, particularly during manufacture. When off center, the fiber has a tendency to conform to the helical path of the textile serve, aggravating a tendency toward microbending. Microbends result in a significant loss of light transmission. Furthermore, when concentricity is not maintained, it is more difficult to connect cables so that the optical fibers are aligned precisely. Assuring concentricity would make handling during manufacture easier, increase the durability of the product, and provide for more precisely aligned connections.

One remedy is to replace the serve with an extruded tube, but this approach is costly. Prior tubeless cables have approached the problem of microbending by serving the textile strength members directly over a heavily buffered optical fiber. The heavy buffering reduces a tendency for the helical path of the serve to induce microbending in the optical fiber. However, the heavy buffering increases production costs without improving the concentricity of the fiber within the serve. As indicated above, this lack of concentricity is a cause of microbending and, therefore, increased signal attenuation.

One possible remedy to loss of concentricity during manufacture would be to keep the fiber taut during the serving operation. If sufficient tension is placed on the fiber as the serve is being applied, and if this tension is maintained during all subsequent operations, the fiber can be kept on its center position. However, the required tension would be likely to damage or break many of the optical fibers now in use. Furthermore, residual tension in the fiber after cable manufacture can itself result in higher attenuation and poorer mechanical performance.

A major object of this invention is to provide an economical tubeless fiber optic cable with an improved means for assuring the concentricity of the optical fiber and a textile serve.

Another object of this invention is to provide an improved tubeless fiber optic cable which minimizes transmission losses due to microbending.

A still further object of this invention is to provide a method of manufacturing a tubeless cable with improved concentricity between the fiber and a serve.

Other objects and features of the invention will be apparent from the following description and from the drawings.

BRIEF DESCRIPTION OF THE DRAWINGS

FIG. 1 is a side view of a cable embodying the present invention drawn on an enlarged scale with portions removed to show the interior of the cable.

FIG. 2 is a sectional view taken along line 2—2 of FIG. 1.

FIG. 3 is an enlarged sectional view taken along line 3—3 of FIG. 1.

FIG. 4 is a schematic diagram illustrating a method of manufacturing a cable in accordance with the present invention.

DESCRIPTION OF THE PREFERRED EMBODIMENT

Referring to the drawings, a fiber optic cable in accordance with the preferred embodiment of the present invention is shown generally at 10 in FIGS. 1 and 2. A fiber 12, suitable for use as an optical waveguide extends along the axis of the cable. During manufacture of the cable, a coating 14 of a highly viscous fluid, is applied over the optical fiber 12. Immediately thereafter, textile strength members are laid over the coated fiber in a serving operation to form a textile serve 16. The textile serve 16 protects and supports the optical fiber. The viscous coating 14 maintains the concentricity of the fiber 12 within the textile serve during the serving operation and subsequent manufacture. A cable jacket 18 is then extruded over the textile serve so as to protect the interior elements of the cable.

During use, the viscous coating 14 conforms to irregularities in the serve, including irregularities induced by flexing the cable. The viscous coating thereby buffers the optical fiber 12 from the lack of smoothness inherent in a serve and from further irregularities induced during use of the cable; in this way the viscous coating protects the fiber from distorting forces which might otherwise cause microbending. Additionally, the viscous coating helps to maintain the concentricity of the fiber within the serve so that the tendency of the fiber to conform to the helical path of the serve is mitigated, thus alleviating another source of microbending. Finally, the viscous coating facilitates the relative longitudinal movement of the fiber within the serve so that any frictional forces between the two are well distributed during flexing of the cable and with temperature fluctuations; once again, a source of microbending is obviated. Accordingly, by maintaining concentricity during manufacture and use of the cable, by buffering the fiber from surface irregularities of the serve, and by facilitating longitudinal movement between the serve and fiber, the viscous coating significantly reduces the likelihood of microbends occurring. The result is a cable the optimal optical performance of which is more readily and economically achieved and maintained. Additionally, since concentricity is improved, fiber alignment is more readily achieved when cables are connected to other cables or terminal devices.

Referring in greater detail to the drawings, the optical fiber 12 is structured of multiple components, as indicated in FIG. 3. Preferably, the fiber is SDF fiber manufactured by Corning. A silica core 20 extends longitudinally along the axis of the optical fiber and serves as a path for optical wave transmissions. A silica cladding 22, of lower index of refraction than the core, extends concentrically upon the core. The cladding is bounded at its outer surface by a double layered tight buffer jacket 24 of acrylate. By way of example, for the illustrated fiber 12, the core and the cladding diameters are 100±4 and 140±6 micrometers, respectively. The diameter of the optical fiber including the buffer jacket is 500±20 micrometers.

The first step in manufacturing the fiber optic cable 10 is the application of the layer of highly viscous fluid 14 to the optical fiber 12. The highly viscous fluid functions dually as a radial adhesive and as a longitudinal lubricant. The viscous coating acts as a radial adhesive in that its viscosity inhibits the movement of the fiber away from the cable axis and toward the outside of the serve. The viscous coating serves as a longitudinal lubricant by reducing localized friction that might otherwise impede the relative longitudinal movement of the serve 16 and the fiber 12; such movement is necessary to avoid binding when the cable is flexed.

The Young's modulus of the highly viscous fluid should be less than that of the buffer jacket 24 of the optical fiber 12. As is known in the art and practiced in U.S. Pat. No. 4,105,284, low modulus coatings reduce the microbending of a fiber by conforming to the surface irregularities and, thereby, reducing the effective stress on the fiber. Thus, the optical fiber 12 is buffered against the uneven stresses induced by the helical path of the textile serve. The optical fiber is also buffered against other irregularities of the serve that might occur during flexing of the cable.

Several highly viscous fluids, including a variety of colloids, are suitable. Silicon greases and gels have been used successfully; additionally, many polyfluoronated hydrocarbons can be suspended in solution to form a highly viscous fluid and would perform the intended function. Tetrafluoroethylene grease is preferred because it exhibits less capillary migration than do other types of grease, and, therefore, is less messy in production and in use. Furthermore, tetrafluoroethylene grease retains its original characteristics over a wide temperature range. In the preferred embodiment, the grease coating has an outer diameter of 600±50 micrometers.

The application of the viscous coating may be accomplished in a variety of ways and still remain within the scope of the present invention. Economic considerations make it desirable that the viscous coating be applied according to one of the means of the following list: a dip-coat, air-dry operation; a wiping operation; a spraying operation; or an electro-static deposition. Such application methods will allow the grease to be applied along with, i.e. in tandem with, the serving operation. In the preferred embodiment, the serving operation immediately succeeds dip-coating and air-drying of the tetrafluoroethylene grease.

The textile material of the serve 16 should be flexible, lightweight, and of high tensile and flexural strength so as to provide protection and strength to the optical fiber. Kevlar 49, an aramid fiber manufactured by E. I. DuPont de Nemours and Company is the preferred material for the serve. The Kevlar textile is helically wound upon the grease coated fiber. The adhesive functioning of the grease coating 14 allows longer lay lengths while preserving concentricity, thus economically reducing the amount of textile needed for the serve. In the preferred embodiment, the serve consists of eight strands of 1420 denier Kevlar helically wound with a 10 centimeter pitch.

The fiber optic cable is easily manufactured as by a method illustrated in FIG. 4. The cable goes through four stages during the procedure: uncoated fiber 100, coated fiber 102, fiber with serve 104 and completed cable (not shown). The fiber begins in a wound condition on an optical payoff apparatus 110. From the payoff apparatus 110, the fiber is pulled toward a coating station 120. The fiber 100 enters the coating station over a feed pulley 122, proceeds downwardly through an entrance port 124 and into a jar 126 containing viscous coating material and solvent in solution 128. The viscous coating material is, preferably, tetrafluoroethylene grease. The path of the fiber is guided within the coating solution 128 by means of an application pulley 130. The application pulley is suspended from a lid 132 by means of a bracket 134. The lid includes the entrance port 124 and an exit port 136 through which the coated fiber 102 leaves the application stage 120.

The coated fiber 102 is drawn upwardly through a serving station 140. The serving station includes a serving drum 142 having eight bobbins 144 which feed textile strength members 146 onto the coated fiber at a point 148 above the drum 142. The preferred textile strength members are 1420 denier Kevlar 49.

The now reinforced fiber 104 proceeds upwardly to and over a capstan 150 which provides the drawing force that moves the fiber from station to station. The capstan 150 may also be linked so as to drive the drum 142 by means not shown. The reinforced fiber 104 proceeds from the capstan to an extruder (not shown) where a flexible cable jacket is applied over the textile serve to complete the construction of the fiber optic cable. The extruded jacket is preferably of black, flame retardant polyurethane. The outer diameter of the finished cable of the preferred embodiment is 3.0±0.2 millimeters.

It should be noted that the air-drying operation is rapid enough so that negligible wait is required before the serving and extrusion operations are performed. This time savings results in a significant reduction in manufacturing costs. The method of the present invention is to be contrasted with the prior art practices of extruding a buffer layer between the fiber and serve, or of applying a heat cured buffer by dip coating. The latter method requires considerable curing time so that the serve could not immediately follow the application of the coating. The present invention is much faster and more economical than the alternatives of the prior art in that it allows a practical merger of the coating and serving operations. Additionally, the heavy buffering practiced in the prior art does not in itself assure concentricity of the serve in maintaining the axial position of the fiber so that concentricity is less likely to be maintained. Should the fiber leave the neutral axis of the helix, any advantages of the heavy buffering in limiting microbending and resulting transmission would be largely offset. Accordingly, the present invention provides a more effective and a more economical method of manufacturing a fiber optic cable with improved concentricity.

The present invention, in its preferred embodiment comprising SDF fiber, tetrafluoroethylene grease, a Kevlar 49 serve, and a black, flame retardant polyurethane cable jacket, with dimensions as indicated above, has been subjected to extensive testing. Optically, the illustrated cable performs as follows: the attenuation at 820±50 nanometers is less than or equal to 8.0 dB/km; the numerical aperature at 10% intensity is 0.30±0.01; and the 3 dB bandwidth is 20 MHz-km. Attenuation does not exceed 10.0 dB/km in a −23° C. to +85° C. temperature range. A storage temperature of −40° C. may be used with 100% recovery in the in-use temperature range.

Mechanically, the illustrated cable withstands a 30 kg load for one hour without permanent degradation in optical or mechanical performance. The cable is designed to withstand a 5 kg load for one year without degradation in optical or mechanical performance.

The illustrated cable withstands a 0.7 cm radius bend for one hour without permanent degradation of mechanical or optical performance, and a 3 meter length of cable may be wound about a mandrel of 0.15 cm radius for one hour with 100% recovery after removal. The cable is designed to withstand a 2.5 cm radius bend indefinitely without degradation in optical or mechanical performance.

In a test of flexure strength, a sample of the cable was inserted between a pair of 14 mm outside diameter rollers and subjected to a 180° bending cycle at a rate of 30 cycles per minutes. The upper end of the cable was secured to the swinging arm by tying tight square knots in the cable at the top end. A 1 kg weight was attached to the lower end by tying tight square knots in the cable. The sample withstood 50,188 cycles without fracture of the fiber or the jacket before the test was stopped.

In an impact resistance test, a 1 kg weight was dropped from a 0.5 meter height onto a 1 inch O.D. steel mandrel laid across the cable's length. The impact was applied at each of 10 random points along the cable's length. Two of these impact points were subjected to the flexure strength test described above; there were no fiber fractures and no jacket degradation.

Thus, in accordance with the present invention, a tubeless fiber optic cable is presented in which the concentricity of the optical fiber is assured and maintained by means of a highly viscous coating between a textile serve and the optical fiber. The cable of the preferred embodiment is further characterized by high tensile, flexure and impact strength. The preferred cable is flexible and resilient. The black polyurethane cable jacket is flame and moisture resistant. The preferred cable maintains these desirable characteristics over a wide temperature range.

Many variations upon the preferred embodiment are possible which would remain within the spirit and scope of the present invention. Other optical fibers might be selected, and the rest of the dimensions and specifications would have to be adjusted accordingly. A few of the many possible variations in coatings, serves, and jackets have been indicated above. It should be understood from the possible variations that the above disclosure is to be considered as an exemplification of the principles of the invention and is not intended to limit the invention to the embodiment illustrated and variations listed.

What is claimed is:

1. A fiber optic cable comprising an optical fiber extending longitudinally along the axis of the cable, a continuous thin layer of highly viscous fluid coated directly on the optical fiber, a helically wound textile serve disposed coaxially about said optical fiber directly over said continuous thin layer of highly viscous fluid and in contact therewith, and a flexible cable jacket extending longitudinally and coaxially about said textile serve.

2. A fiber optic cable in accordance with claim 1 wherein the highly viscous fluid comprises a suspension of a polyfluoronated hydrocarbon.

3. A fiber optic cable in accordance with claim 1 wherein the highly viscous fluid comprises a tetrafluoroethylene grease.

4. A fiber optic cable in accordance with claim 1 wherein the textile serve consists of an aramid.

5. A fiber optic cable in accordance with claim 1 wherein the optical fiber comprises a silica core, a cladding about such core, and a double layered tight buffer jacket of acrylate.

6. A fiber optic cable in accordance with claim 1 wherein the optical fiber comprises a core extending longitudinally and axially within the fiber optic cable, a cladding extending longitudinally about said core, and a buffer jacket extending longitudinally about said cladding.

7. A fiber optic cable in accordance with claim 6 wherein the core consists of a silica, the cladding consists of a silica, and the buffer jacket consists of an acrylate.

8. A fiber optic cable in accordance with claim 6 wherein the highly viscous fluid has a Young's modulus less than the Young's modulus of the buffer jacket of the optical fiber.

9. A fiber optic cable comprising:
   an optical fiber, including a core, a cladding extending longitudinally about and upon the core, and a buffer jacket extending about and upon the cladding;
   a tetrafluoroethylene grease coating extending upon said optical fiber and having a Young's modulus less than the Young's modulus of the aforementioned buffer jacket;
   a textile serve extending helically about said tetrafluoroethylene grease coating and in contact therewith; and
   a cable jacket extending longitudinally about and upon said serve;
   whereby, said tetrafluoroethylene grease coating maintains the concentricity of said optical fiber and said textile serve.

10. A method of manufacturing a fiber optic cable having an optical fiber, a textile serve composed of a plurality of textile strength members, and a cable jacket, the method comprising the steps of: coating the optical fiber with a continuous thin layer of highly viscous fluid, overlaying the coated optical fiber with the textile strength members in a serving operation so that the textile strength members contact the highly viscous fluid and the concentricity of the optical fiber is maintained within the resulting textile serve, and extruding the cable jacket over the textile serve.

* * * * *